July 9, 1968 W. C. GREGORY 3,391,829

SPRAY GREASE GUN

Filed Jan. 30, 1967

INVENTOR.

WILLIAM C. GREGORY

By Huebner & Worrel

ATTORNEYS.

United States Patent Office 3,391,829
Patented July 9, 1968

3,391,829
SPRAY GREASE GUN
William C. Gregory, 520 N. Burris Ave., Compton, Calif. 90221
Filed Jan. 30, 1967, Ser. No. 612,605
5 Claims. (Cl. 222—95)

ABSTRACT OF THE DISCLOSURE

This apparatus includes a grease-holding vessel which has an outlet through which grease can be ejected and an air pressure responsive piston which forces grease from the vessel. Valve controlled compressed air conduits provide a passageway to divert compressed air between the piston and a spray forming mixing chamber adjoining the grease outlet from the vessel.

*Background of the invention*

Prior to this invention spray guns have been developed which are suitable for spraying watery or oily fluids such as paints. However, when the viscosity of such fluids is sufficiently high that the substance is categorized as a grease, then such spray guns are no longer satisfactory because the grease will not break into droplets to form a spray.

Thus, in using silicone greases to coat electrical equipment instead of spraying the grease it is the normal practice of utility company workmen to smear the grease on the electrical equipment by hand. Often, such equipment is electrically energized so that, in order to prevent electrocuting the workman, the associated electrical circuits must be shut off. This involves a great loss of time and money as well as substantial inconvenience to the users of such electrical equipment. Nevertheless, to prevent short circuits in the equipment, coating with silicone grease is needed and since this coating gradually is worn off it must be periodically replaced.

*Summary of the invention*

Thus, it is an object of this invention to provide a means for spraying grease so as to thereby alleviate the inefficiency and inconvenience of manual methods of application.

A further object of this invention is to provide a means for spraying grease which utilizes a compressed air blast to break a small portion of grease into droplets which are sprayed.

A still further object of this invention is to provide apparatus for spraying grease which includes a conduit through which compressed air is received and diverted between a grease containing vessel where the air causes grease to be forced therefrom into a mixing chamber and an outlet line which communicates with the mixing chamber and sprays grease contained therein.

*Description of the preferred embodiment*

Figures 1, 2, 3, 4:
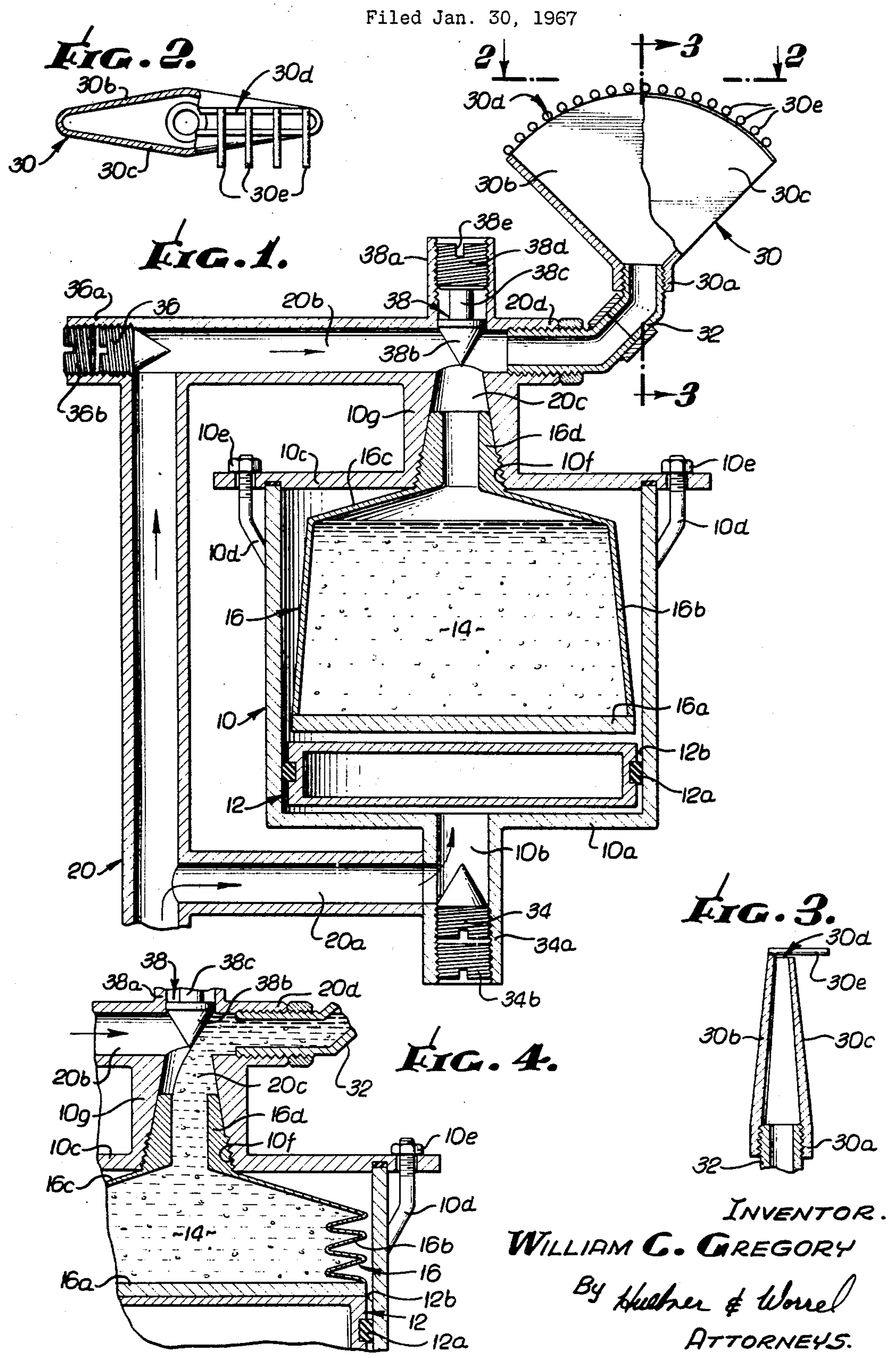
FIGURE 1 is a vertically sectioned view of a spray grease gun in accordance with this invention showing the grease reservoir, interconnected air conduits and spray outlet nozzle.
FIGURE 2 is a partly horizontal, sectioned, top plan view taken through 2—2 in FIGURE 1 showing the nozzle used in the apparatus.
FIGURE 3 is a vertically sectioned view of the nozzle taken through 3—3 in FIGURE 1.
FIGURE 4 is a fragmented, vertically sectioned view of the grease gun as in FIGURE 1 during a grease spraying operation.

Referring to the drawings a grease spray gun in accordance with this invention includes a vessel or reservoir 10 within which grease is stored and a bypass conduit line 20 which receives compressed air, communicates with the reservoir 10 and provides the passageway through which compressed air sprays grease ejected therefrom out a nozzle 30. Since ordinarily this spray gun is to be used around high voltage electricity the apparatus is preferably made of electrically nonconductive material such as an epoxy resin or polyethylene plastic reinforced with fiber glass or asbestos.

The reservoir 10 is a cylindrical pressure vessel formed with a flat circular bottom plate **10*a* which has a centrally positioned circular air inlet opening 10*b* passing therethrough. A flat circular lid 10*c* is removably mounted on the top of reservoir 10 by quick-release bolts 10*d* which are attached to the upper sides of reservoir 10 and pass through complementary holes in lid 10*c* to which they are secured by nuts 10*e*. Extending centrally through lid 10*c* is a circular grease outlet opening 10*f* which is preferably partly internally threaded and shaped as a truncated cone which extends through a cylindrical outlet tube 10*g* protruding outwardly and upwardly from lid 10*c***.

Movably disposed and axially aligned in the bottom of the reservoir 10 is a circular, plate-shaped piston 12 which is slightly smaller than the internal circumference of reservoir 10. Circumferentially fitted in an annular slot in the periphery of piston 12 is a piston ring **12*a* which fits tightly enough within reservoir 12 to minimize air leakage but will still slide vertically relative to the abutting internal walls 12*b* of reservoir 10 which, in effect, will serve as a cylinder for piston 12. The piston ring 12*a*** can be a leather gasket or made of a material ordinarily used in O rings.

To facilitate sliding of piston 12 the lower internal walls **12*b* of the reservoir 10 may be lubricated or the piston ring 12*a* can be made of a slippery material such as Teflon. The piston 12 is moved axially in reservoir 10 in response to air pressure variations primarily caused by air entering through opening 10*b* in bottom plate 10*a***.

Supported above the piston 12 within reservoir 10 is a supply of grease 14 normally contained within an enclosed collapsible receptacle 16. If the grease 14 is not in a receptacle 16 then additional gaskets (not shown) should be secured within the reservoir 10 so as to eliminate leakage.

However, as shown, the collapsible receptacle 16 is formed of a flexible material which, when pressed by piston 12 as in FIGURE 4, squirts grease 14 contained therein through outlet **10*f* like a tube of toothpaste. This receptacle 16 is formed with a round flat base 16*a*, slightly inwardly tapering annular walls 16*b* and upwardly and inwardly tapering annular top shoulders 16*c* which centrally terminate at a circular grease outlet 16*d* which axially protrudes from the top of receptacle 16. This grease outlet 16*d* is shaped externally as a partly threaded truncated cone which mates with the outlet opening 10*f* in reservoir 10** within which it is threadably secured.

The grease 14 contained within receptacle 16, when coating electrical insulators, for instance, is preferably of the silicone type. That is, one or more carbon atoms in a hydrocarbon chain have been replaced by silicone atoms. Examples of such grease are Insul-Jel made by General Electric Co., and the Dow-Corning Silicone-Jel No. 3 and No. 5. These greases can be obtained in a collapsible receptacle 16 such as illustrated herein.

The conduit line 20 is connected to a source of compressed air (not shown) which is normally dehydrated to prevent the possibility of short circuiting high voltage electricity therethrough. As the compressed air passes through conduit line 20 adjacent to reservoir 10 a portion of the air may be diverted thereto by a reservoir branch line 20*a* from conduit line 20 which communicates with reservoir 10 through its inlet opening 10*b*. Another portion of conduit line 20 forms the bypass line 20*b* which communicates with the outlet tube 10*g* from the reservoir 10 to mix air with grease 14 ejected therefrom. This juncture of bypass line 20*b* with outlet tube 10*g* provides a mixing chamber 20*c* for the grease and a stream of compressed air which, when formed into appropriate size droplets, is sprayed therefrom through a conduit outlet 20*d*.

A flat fan-shaped nozzle 30 is attached via a universally articulated movable pipe joint 32 to the conduit outlet 20*d*. This pipe joint 32 is externally threaded on each end and screwed into complementarily internally threaded portions, respectively, of conduit outlet 20*d* and nozzle inlet 30*a*. Diverging outwardly from the inlet 30*a* are the spaced fan-shaped walls 30*b* and 30*c*, of the nozzle 30 shown. The outlet from nozzle 30 is through its shallow, arc-shaped orifice 30*d* which includes a plurality of spaced parallel wires 30*e* mounted across the orifice 30*d*. The purpose of this preferred form of nozzle shown is to spread the grease spray through the fan-shaped portion and slow its velocity when it passes the parallel wire barriers so as to facilitate the flow of grease over the surface to which it is being applied. However, other forms of nozzles could be used with this invention though probably with some detriment to the efficiency of the device.

In order to control the relative amount of compressed air which is diverted through conduit line 20 between its reservoir branch line 20*a* and bypass line 20*b* a cone-shaped reservoir valve 34 and a cone-shaped spray valve 36, respectively, are interposed in these lines. Each of the valves 34 and 36 are externally threaded and movably mounted in complementarily internally valve seats 34*a* and 36*a* protruding from elbow bends in lines 20*a* and 20*b*, respectively. When the valves 34 and 36 are adjusted to protrude into these respective portions of conduit line 20 to the extent desired, slotted, externally threaded, lock nuts 34*b* and 36*b* are screwed tight against them through open, complementarily internally threaded extensions of valve seats 34*a* and 36*a*. Each of the valves 34 and 36 is so mounted that it can be screwed into the conduit line 20 to such an extent that it completely blocks it or is moved therefrom to clear the line entirely from a flow blocking position.

At the juncture of the bypass line 20*b* and the outlet tube 10*g* a cone-shaped mixing valve 38 projects into this line 20*b* and can be moved through it into the adjacent mixing chamber 20*c*. It is mounted for axial movement in an open mixing valve seat 38*a* which is axially aligned with outlet tube 10*g* on the opposite side of the bypass line 20*b*. The mixing valve 38 is formed with a cone-shaped head 38*b* connected by a reduced diameter intermediate shank 38*c* to an externally threaded end portion 38*d* provided with an adjusting slot 38*e* in its outer face.

The externally threaded end portion 38*d* of valve 38 is screwed into a complementary internally threaded portion of mixing valve seat 38*a* which extends therein sufficiently that the cone-shaped head 38*b* of valve 38 can be slid into a predetermined position within mixing chamber 20*c*. The largest outer diameter of the cone-shaped head 38*b* is approximately the diameter of the mixture chamber 20 at its juncture with bypass line 20*b* so that it is capable of blocking grease ejected from reservoir 10 completely if desired. At the same time air flowing through bypass line 20*b* will not be blocked by valve 38 since there will still be room for it to flow around the reduced diameter shank 38*c*. Normally, however, the cone-shaped head 38*b* of valve 38 will project into mixing chamber 20*c* just far enough to cause the grease to be sprayed in the predetermined optimum size of droplets.

In operation, dehydrated compressed air normally enters conduit line 20 and is diverted between reservoir branch line 20*a* and bypass line 20*b*. The relative amount of diversion is controlled by adjusting the protrusion of valves 34 and 36 into these respective lines so that there is just enough air pressure in reservoir line 20*a* to gradually lift piston 12 so that it presses against the bottom of the receptacle base 16*a* and a steady flow of grease 14 is ejected from receptacle 16 through grease outlet 16*d*. This grease enters into mixing chamber 20*c* where it is fragmented into droplets and sprayed through nozzle 30 by a blast of air flowing through line 20*b*.

The receptacle 16 is squeezed as shown in FIGURE 4 when piston 12 is raised and, when empty, is removed from reservoir 10 by disengaging lid 10*c* and unscrewing it from within outlet opening 10*f*. Another receptacle 16 is replaced in operative position by reversing this procedure. During the replacement operation the air pressure is normally shut off in conduit line 20.

The amount of mixing and consequent size of droplets in the spray is controlled by the amount that the head 38*b* of valve 38 protrudes into mixing chamber 20*c*. When the desired consistency of the spray is attained valve 38 is normally preset in that position. In a like manner valves 34 and 36 are preset in position when the proper balance of air diversion is attained. The universal movement of joint 32 facilitates the spraying of the grease gun and the barriers on the fan-shaped nozzle 30 maximize the contact time and consequent grease deposited where wanted with the apparatus.

Though shown as a compact structure preferably using flexible hoses as the conduit lines the component parts could be separated when convenient to do so without altering the inventive principle implemented herein. That is, for instance, if a large quantity of grease is desired to be carried the reservoir 10 could be enlarged. However, since the weight of the grease would likely make the complete apparatus too heavy for convenient utilization the reservoir could be left on the ground and an elongated conduit extended to the nozzle 30 which would be the only part that a workman would need to carry.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and devices.

I claim:

1. A spray gun for a viscous fluid such as grease comprising: a closed cylindrical pressure vessel reservoir formed with an air inlet in one end and a viscous fluid outlet in the opposite end with space between for viscous fluid to be carried, a piston slidably mounted for axial movement within said reservoir substantially continuously abutting the internal side walls of said reservoir and adapted to force viscous fluid contained in said reservoir out said outlet when sufficient air pressure is introduced through the air inlet end thereof; a mixing chamber communicating with said outlet; a compressed air conduit adapted for connection to a source of compressed air and having outlet branches comprising a reservoir line communicating with the air inlet in said reservoir and a spray line communicating with said mixing chamber; a spreader type spray nozzle connected with said spray line past its point of communication with said mixing chamber; adjustable reservoir valve means in said reservoir line; adjustable spray valve means in said spray line; and adjustable mixing valve means for said mixing chamber to regulate the relative proportion of viscous fluid to air delivered to said spray nozzle.

2. A spray gun for a viscous fluid such as grease, comprising: a closed cylindrical pressure vessel reservoir formed with an air inlet in one end and a viscous fluid outlet in the opposite end with space between for viscous fluid to be carried, a piston slidably mounted for axial movement within said reservoir substantially continuously abutting the internal side walls of said reservoir, a body of viscous fluid packed between the piston and the viscous fluid outlet, the piston being adapted to force viscous fluid contained in said reservoir out said outlet when sufficient air pressure is introduced through the air inlet thereof; a mixing chamber communicating with said outlet; a compressed air conduit adapted for connection to a source of compressed air and having outlet branches comprising a reservoir line communicating with the air inlet in said reservoir and a spray line communicating with said mixing chamber; a spray nozzle connected with said spray line past its point of communication with said mixing chamber; adjustable reservoir valve means in said reservoir line; adjustable spray valve means in said spray line; and adjustable mixing valve means for said mixing chamber to regulate the relative proportion of viscous fluid to air delivered to said spray nozzle; whereby viscous fluid is delivered into said mixing chamber at a predetermined rate relative to air flowing therethrough and is broken up into particles by the air and carried thereby at a given velocity into the spray nozzle; the spray nozzle embodying an outwardly flared configuration adapted to distribute air laden with viscous fluid particles in a spread pattern and at a relatively reduced velocity.

3. A spray gun as defined in claim 2 which includes a collapsible receptacle containing the viscous fluid, said receptacle having an outlet communicating with the viscous fluid outlet from said reservoir and having a base portion responsive to movement of the piston in said reservoir so that movement of said piston toward said last named outlet causes said receptacle to collapse and viscous fluid to be delivered therefrom.

4. A spray gun as defined in claim 2 wherein the spray nozzle is fan-shaped and formed with a narrow, elongated outlet across which are interposed a plurality of spaced barrier rods to interrupt flow of air laden with viscous particles and further reduce the velocity thereof.

5. A spray gun as defined in claim 1 in which all externally exposed parts are formed of electrically non-conductive material whereby the gun may be safely used in the vicinity of charged electrical lines.

References Cited

UNITED STATES PATENTS

| | | | |
|---|---|---|---|
| 2,505,798 | 5/1950 | Skinner ---------- | 222—386.5 X |
| 2,581,353 | 1/1952 | Bonvillian et al. ---- | 239—592 X |
| 2,618,510 | 11/1952 | Mills ----------- | 239—313 X |
| 3,225,759 | 12/1965 | Drapen et al. ----- | 239—313 X |
| 3,292,630 | 12/1966 | Paulus ---------- | 239—552 X |

FOREIGN PATENTS

| | | |
|---|---|---|
| 727,492 | 4/1955 | Great Britain. |

STANLEY H. TOLLBERG, *Primary Examiner.*